Patented July 21, 1936

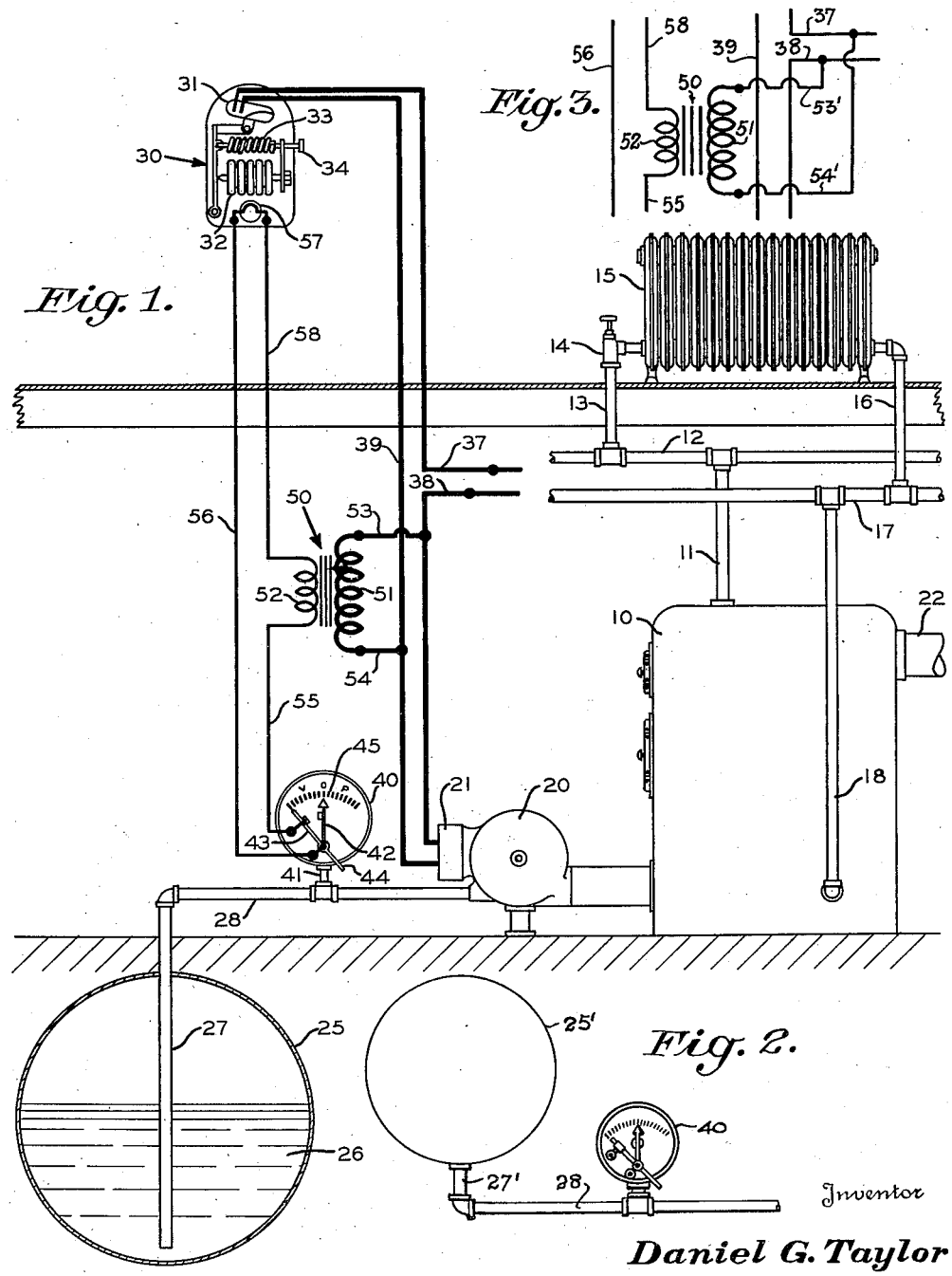

2,048,653

UNITED STATES PATENT OFFICE 2,048,653

INDICATING AND CONTROLLING SYSTEM

Daniel G. Taylor, Minneapolis, Minn., assignor to Minneapolis-Honeywell Regulator Company, Minneapolis, Minn., a corporation of Delaware Application December 19, 1934, Serial No. 758,244

16 Claims. (Cl. 236—1)

This invention relates to indicating and controlling systems in general and more particularly to liquid level indicating and controlling systems for use in a heating system employing a heater, a liquid fuel burner and a liquid fuel reservoir therefor.

It is an object of this invention to provide an indicating and controlling system for a heating system having a liquid fuel burner and reservoir therefor wherein a visual indication is made when the liquid level in the reservoir lowers to a predetermined value.

Another object is to provide a control system for use with a heating system of the class described wherein the normal operation of the fuel burner is stopped when the liquid level in the reservoir lowers to a predetermined value.

A further object is to provide a heating system having a liquid fuel burner and a liquid fuel reservoir therefor which is controlled by a space thermostat wherein a visual indication is made at the space thermostat and wherein the setting of the thermostat is effectively lowered when the liquid level in the reservoir lowers to a predetermined value.

A still further object is to provide an indicating and controlling system for a heating system having a liquid fuel burner, a liquid fuel reservoir therefor and a space thermostat for controlling the operation of the liquid fuel burner wherein the setting of the thermostat is effectively lowered upon the establishment of a predetermined low liquid level in the fuel reservoir whereby the temperature of the space to be heated is lowered to give a sensation of coldness to indicate that the fuel supply in the reservoir is low.

Other objects and advantages will become apparent to those skilled in the art by reference to the accompanying specification, claims and drawing in which drawing:

Fig. 1 diagrammatically illustrates a conventional heating system with my invention applied thereto.

Fig. 2 is a view of a portion of the heating system showing the fuel reservoir tank located above the level of the liquid fuel burner.

Fig. 3 is a view of a portion of the wiring connections of my invention showing a modified hook-up.

Although the invention may be applied equally as well to a hot air heating system or steam heating system, for purposes of illustration it is shown and described as applied to a hot water heating system having a hot water boiler 10 with a pipe 11 leading upwardly from the top thereof to a hot water header 12. Risers 13 extend upwardly from the hot water header 12 to radiators 15 to supply hot water thereto. The supply of hot water to the radiators 15 is controlled by the usual manually operated valves 14 located in the risers 13. Cold water is taken from the radiators 15 through risers 16, cold water return header 17 and pipe 18 to the lower portion of boiler 10 to again be heated therein.

Water in the boiler 10 is heated by a conventional electrically driven liquid fuel burner 20. Located on the liquid fuel burner 20 is a control box 21 for controlling the operation thereof having the usual safety switches and control mechanism contained therein. The expended gases are carried from the combustion chamber of the boiler 10 through a flue 22 to a chimney, not shown.

Located below the level of the liquid fuel burner 20 is a liquid fuel reservoir 25, liquid fuel 26 being supplied to the reservoir by some means, not shown. Extending upwardly from a point adjacent the bottom of the liquid fuel reservoir 25 is a vertical pipe 27 which connects to a supply pipe 28.

Upon operation of the electrically driven liquid fuel burner 20, liquid fuel 26 is drawn upwardly from the reservoir 25 to the electrically driven liquid fuel burner 20. The liquid fuel burner 20 and the vertical pipe 27 are provided with the usual check valves and foot valves to maintain fuel in the pipes 27 and 28 at all times.

The liquid fuel reservoir may also be located above the level of the liquid fuel burner 20 and such location is shown in Fig. 2 at 25'. The liquid fuel reservoir 25' may be connected to the supply pipe 28 by means of a pipe shown in dotted lines at 27'.

Located in the room or space to be heated is a space thermostat 30 which may be of the type shown and described in Patent 1,740,370 to L. A. M. Phelan and patented March 5th, 1929. This space thermostat 30 houses a conventional mercury switch 31 having the usual electrodes and mercury therein. The mercury switch 31 is urged towards an open position by a volatile fluid bellows 32 which is responsive to variations in space temperature. Acting against the action of volatile fluid bellows 32 is a tension spring 33 which tends to move the mercury switch 31 towards closed position. By means of an adjusting screw 34, the tension in the spring 33 may be adjusted to determine at which temperature the mercury switch 31 will be closed all of which is pointed out in the above referred to patent.

Wires 37 and 38 are connected to some source of power, not shown, wire 37 extending to one of the electrodes of mercury switch 31 and wire 38 extending to the control box 21 of the liquid fuel burner 20. A wire 39 connects the other electrode of mercury switch 31 to the control box 21 of the liquid fuel burner 20.

When the room or space temperature falls to a predetermined value, mercury switch 31 of the space thermostat 30 will be tilted to a closed position to complete an electric circuit from the source of power, not shown, through wire 37, mercury switch 31, wire 39, control box 21, and wire 38 to operate the liquid fuel burner 20. Operation of the liquid fuel burner 20 causes a vacuum to be created in the supply pipe 28 and the vertical pipe 27 to draw liquid fuel 26 therethrough into the liquid fuel burner 20 whereby combustion is established in the boiler 10 to provide heat to the space or room to be heated by means of the radiator 15. When the space or room temperature has risen to a predetermined value, mercury switch 31 will be tilted to an open position, breaking the above mentioned circuit and stopping operation of the liquid fuel burner 20 until the space thermostat 30 again calls for heat.

If the reservoir 25' of Fig. 2 is used instead of reservoir 25, the general operation will be the same except that fuel will be fed to the liquid fuel burner 20 under pressure caused by the hydraulic head of the liquid fuel and not under vacuum as above described.

Connected to the pipe 28 by means of a pipe 41 is a combined indicating and switching mechanism 40 which may be of the Bourdon tube type which is responsive to either pressure or vacuum existing in the pipe 28. This type of instrument is old in the art and a specific description thereof is not considered necessary, it being sufficient to state that the Bourdon tube contained therein operates a combined pointer and contact 42. Located adjacent the combined pointer and contact 42 is an adjustable contact 43, having a handle 44 extending outwardly from the instrument 40 whereby proper adjustment of the adjustable contact 43 may be made. Located on the face of the instrument 40 are graduations in terms of pressure and vacuum, in this instance the vacuum graduations being located at the left of the zero point and the pressure graduations being located at the right of the zero point.

When no pressure or vacuum exists in the pipe 28, the combined pointer and contact 42 is maintained at its center or zero position. When a vacuum occurs in the pipe 28, the pointer moves to the left in an amount proportionate to the amount of vacuum established in the pipe 28. Upon the existence of a pressure in the pipe 28, the pointer 42 moves to the right a proportionate amount with respect to the amount of pressure in the pipe 28.

A step down transformer is generally indicated at 50 and has a primary 51 which may be connected by means of wires 53 and 54 to wires 38 and 39. One end of the secondary 52 of the transformer 50 is connected by means of a wire 55 to the adjustable contact 43 of the combined indicator and switching mechanism 40. The movable pointer 42 is connected by means of a wire 56 to a warning lamp 57 located in or adjacent to the space thermostat 30. The warning lamp 57 is connected by a wire 58 to the other end of the secondary 52 of the step down transformer 50. By this construction, when power is supplied to the transformer 50, and when the movable pointer and contact 42 engages the adjustable contact 43, the warning lamp 57 is lighted. If it be desirable to use a warning light of line voltage, the transformer 50 should be eliminated and the indicator 40 and the warning light should be directly connected in parallel to the liquid fuel burner 20.

When the level of the liquid 26 in the reservoir 25 is high, a certain vacuum is required to draw the liquid 26 into the liquid fuel burner 20 and this amount of vacuum is reflected in the instrument 40. When the level of liquid 26 in the reservoir 25 is low, a greater vacuum is required to draw the liquid 26 into the liquid fuel burner 20. This difference in vacuum is due to the change in the liquid head of the liquid 26 in the reservoir 25. The various degrees of vacuum required to draw the liquid 26 from the reservoir 25 are directly reflected by a proportionate movement of the movable pointer and contact 42 of the pressure instrument 40. By properly adjusting the movable contact 43, an electric circuit may be completed through the adjustable contact 43 and the movable contact 42 upon the establishment of a predetermined low liquid level in the reservoir 25. The graduations 45 form a convenient means for determining the amount of adjustment of the adjustable contact 43. Upon the establishment of such low liquid level and the consequent engagement of contacts 42 and 43, an electric circuit is completed from secondary 52 of transformer 50, through wire 55, contacts 43 and 42, wire 56, warning lamp 57 and wire 58, back to the secondary 52. Since, in the preferred embodiment of this invention wires 53 and 54 are connected respectively to wires 38 and 39, the transformer 50 is connected in parallel with the liquid fuel burner 20 and it will not become energized until the liquid fuel burner 20 is placed in operation. When the liquid level in the reservoir 25 reaches a predetermined minimum and when the room thermostat 30 calls for heat to operate the liquid fuel burner 20, the warning light 57 will be lighted to notify the users of the heating system that the liquid fuel supply in the reservoir 25 is extremely low.

The warning light 57 has another function besides that of merely visually indicating as described above. When the light 57 is lighted, heat is given off thereby which effects the volatile fill in the bellows 32 to expand the bellows 32 to tend to maintain the mercury switch 31 towards open position. Because of this, a greater decrease in the space temperature acting on the bellows 32 to contract the same is required to move the mercury switch 31 towards closed position. Therefore, the liquid fuel burner 20 cannot be maintained in operation under normal temperature conditions when the warning light is lighted. It will only be maintained in operation at temperatures lower than those for which the space thermostat 30 is set. Due to the fact that the warning light 57 lowers the effective setting of the space thermostat 30, the room temperature will be maintained at a lower temperature than normal. Such a condition will give a sensation of coldness to the occupants of the space to be heated to sensually notify them that the liquid fuel supply in the reservoir 25 is extremely low.

By reason of this, a double indicator is in effect provided for giving visual indication of the supply of liquid fuel and also a sensual indication of the coldness.

The operation of the device is the same as above when the reservoir 25' is used except that the changes in liquid level in the reservoir 25' will be reflected as positive pressure changes instead of vacuum changes as above. By properly adjusting the adjustable contact 43 on the pressure side of the scale 45, the contact 42 may be made to engage the contact 43 upon the existence of a predetermined low pressure caused by the drop in hydraulic head in the reservoir 25'.

In the above description of the preferred form of this invention, it is noted that the warning light 57 may only be lighted when the liquid fuel burner 20 is in operation because the step down transformer 50 is connected in parallel with the liquid fuel burner 20. If it be desired to maintain the warning light 57 lighted at all times when the liquid level in the reservoir 25 or 25' reaches a predetermined low value, regardless of whether the liquid fuel burner 20 is in operation, the primary 51 of the step down transformer 50 may be connected directly to the source of power. Such connection may be accomplished by means of wires 53' and 54' shown in Fig. 3 to be connected respectively to wires 37 and 38.

From the above, it is seen that I have provided an indicating system for use with a liquid fuel heating system wherein visual and sensual indications are given to the users thereof upon the establishment of a low liquid level in the liquid fuel reservoir.

While several embodiments of this invention have been shown and described, it is obvious that many modifications may be apparent to those skilled in the art and consequently this invention is to be limited only by the scope of the appended claims and the prior art.

I claim as my invention:

1. The combination with a heating system having a heater for heating a space, a liquid burner and a liquid reservoir therefor, of a space thermostat for controlling the operation of the liquid burner, control means responsive to changes in liquid level in said reservoir and means connected to said control means for lowering the setting of said space thermostat upon the establishment of a predetermined low liquid level in said reservoir.

2. In combination with a heating system having a heater for heating a space, a liquid burner and a liquid storage reservoir therefor, of a space thermostat for starting the operation of said liquid burner upon the lowering of the space temperature to a predetermined value, and means responsive to a predetermined low liquid level in said liquid storage reservoir to prevent operation of said liquid burner when the space temperature lowers to said predetermined value.

3. The combination with a heating system having a heater for heating a space, a liquid burner and a liquid reservoir therefor, of a space thermostat for starting the operation of said liquid burner upon the lowering of the space temperature to a predetermined value, control means responsive to changes in liquid level in said reservoir, and means connected to said control means for affecting the operation of said space thermostat upon the establishment of a predetermined low liquid level in said reservoir requiring a space temperature lower than said predetermined value to start said liquid burner.

4. In a heating system of the class described having a heater for heating a space, a liquid burner and a liquid storage reservoir therefor, the combination of a space thermostat for controlling the operation of said liquid burner, a warning light associated with said space thermostat, and means responsive to the level of the liquid in said storage reservoir to light said warning light and stop operation of said liquid burner.

5. In a heating system of the class described, a heater for heating a space, a liquid burner for heating said heater, a space thermostat, means associated with said burner and said thermostat to operate said burner upon the lowering of the space temperature to a predetermined value, a liquid storage reservoir associated with said liquid burner for supplying liquid thereto, a warning light associated with said space thermostat, means associated with said liquid storage reservoir to light said warning light upon the existence of a predetermined low liquid level in said reservoir and to stop operation of said liquid burner.

6. In a heating system of the class described, a heater for heating a space, a liquid burner for heating said heater, a space thermostat, means associated with said burner and said thermostat to operate said burner upon the lowering of the space temperature to a predetermined value, a liquid reservoir associated with said liquid burner for supplying liquid thereto, a warning light associated with said space thermostat, means associated with said liquid reservoir to light said warning light upon the existence of a predetermined low liquid level in said reservoir to give a visual indication and to lower the setting of said space thermostat.

7. In a heating system having a heater for heating a space, a liquid burner and a liquid reservoir therefor, the combination of a space thermostat for controlling the operation of said liquid burner, liquid level responsive means, and means associated with said space thermostat and operatively connected to said liquid level responsive means and said liquid burner to lower the setting of said space thermostat upon the establishment of a predetermined low liquid level in said reservoir and upon said space thermostat calling for heat.

8. In a heating system having a heater for heating a space, a liquid burner and a liquid reservoir therefor, the combination of a space thermostat for controlling the operation of said liquid burner, liquid level responsive means, and means associated with said space thermostat and operatively connected to said liquid level responsive means and said liquid burner to lower the setting of said space thermostat when the liquid level in said reservoir reaches a predetermined minimum and the liquid burner is in operation.

9. In a heating system of the class described having a heater for heating a space, a liquid burner and a liquid reservoir therefor, the combination of a space thermostat for controlling the operation of said liquid burner, a warning light associated with said space thermostat, and means responsive to the operation of said liquid burner and the level of the liquid in said reservoir to light said warning light and stop operation of said liquid burner.

10. The combination with a heating system having a heater for heating a space, a liquid burner and a liquid reservoir therefor, of a space thermostat for starting the operation of said liquid burner upon the lowering of the space temperature to a predetermined value, control means responsive to changes in liquid level in said reservoir, and means associated with said control means and said liquid burner for affecting the operation of said space thermostat upon the establishment of a predetermined low liquid level in said reservoir and upon the starting of said liquid burner requiring a space temperature lower than said predetermined value to continue operation of said liquid burner.

11. In a heating system of the class described, a heater for heating a space, a liquid burner for heating said heater, a space thermostat, means associated with said burner and said thermostat to operate said burner upon the lowering of the space temperature to a predetermined value, a liquid reservoir associated with said liquid burner for supplying liquid thereto, a warning light associated with said space thermostat, means associated with said liquid reservoir and said above mentioned means to light said warning light upon the existence of a predetermined low liquid level in said reservoir and upon operation of said liquid burner.

12. In a heating system of the class described, a heater for heating a space, a liquid burner for heating said heater, a space thermostat, means associated with said burner and said thermostat to operate said burner upon the lowering of the space temperature to a predetermined value, a liquid reservoir associated with said liquid burner for supplying liquid thereto, a warning light associated with said space thermostat, means associated with said liquid reservoir and said above mentioned means to light said warning light upon the existence of a predetermined low liquid level in said reservoir and upon operation of said liquid burner to give a visual indication and to lower the setting of said space thermostat.

13. In a heating system of the class described, a heater for heating a space, a motor operated liquid burner for heating said heater, a source of power, a space thermostat, an electric circuit connecting said motor operated liquid burner, said thermostat and said source of power to operate said burner upon the lowering of the space temperature to a predetermined value, a fuel reservoir, piping connections between said reservoir and said burner whereby liquid fuel is led to said burner, a pressure responsive switching mechanism associated with said piping connections and closed upon the establishment of a predetermined low pressure in the piping connection caused by a predetermined low liquid level in said reservoir, a warning lamp associated with said space thermostat, an electric circuit associated with said above mentioned electric circuit and connecting said switching mechanism and said warning lamp whereby said warning lamp is lighted when the liquid level in said reservoir reaches a predetermined low value and said liquid burner is in operation to give a visual indication of the liquid level in said reservoir.

14. In a heating system of the class described, a heater for heating a space, a motor operated liquid burner for heating said heater, a source of power, a space thermostat, an electric circuit connecting said motor operated liquid burner, said thermostat and said source of power to operate said burner upon the lowering of the space temperature to a predetermined value, a fuel reservoir, piping connections between said reservoir and said burner whereby liquid fuel is led to said burner, a pressure responsive switching mechanism associated with said piping connections and closed upon the establishment of a predetermined low pressure in the piping connection caused by a predetermined low liquid level in said reservoir, a warning lamp located adjacent said space thermostat, an electric circuit associated with said above mentioned electric circuit and connecting said switching mechanism and said warning lamp whereby said warning lamp is lighted when the liquid level in said reservoir reaches a predetermined low value and said liquid burner is in operation to give a visual indication and to lower the effective setting of said space thermostat.

15. In a system of the class described, a liquid reservoir, means for controlling the eduction of liquid from said reservoir, a control mechanism responsive to a predetermined value of a condition for controlling said means, a switching mechanism responsive to variations in liquid level in said reservoir, an indicating device associated with said control mechanism, means connecting said switching mechanism and said indicating device to operate said indicating device upon the establishment of a predetermined low liquid level in said reservoir and to affect said control mechanism to make said control mechanism responsive to a different value of the condition.

16. In a device of the character described, a liquid reservoir, a pumping mechanism for pumping liquid from said reservoir, a control mechanism responsive to a predetermined value of a condition for controlling the operation of said pumping mechanism, a switching mechanism responsive to variations in liquid level in said reservoir, an indicating device associated with said control mechanism, means connecting said switching mechanism and said indicating device to operate said indicating device upon the establishment of a predetermined low liquid level in said reservoir and to affect said control mechanism to make said control mechanism responsive to a different value of the condition.

DANIEL G. TAYLOR.